Nov. 25, 1969

R. B. PETTIBONE 3,479,962

POWER TRANSMISSION

Filed Nov. 22, 1967

INVENTOR.
RAYMOND B. PETTIBONE
BY Van Meter & George

ATTORNEYS

INVENTOR.
RAYMOND B. PETTIBONE
BY

ATTORNEYS

United States Patent Office 3,479,962
Patented Nov. 25, 1969

3,479,962
POWER TRANSMISSION
Raymond B. Pettibone, Detroit, Mich., assignor to Sperry Rand Corporation, Troy, Mich., a corporation of Delaware
Filed Nov. 22, 1967, Ser. No. 684,989
Int. Cl. F04c 1/00, 15/00, 27/00
U.S. Cl. 103—136                                2 Claims

ABSTRACT OF THE DISCLOSURE

A fluid pressure energy translating device having a cam ring with a pumping mechanism therein disposed between two deflectable pressure responsive cheek plates in which the clearance between the cheek plates and the pumping mechanism is dependent upon the pressure balance thereacross; the check plates having balancing recesses thereon and facing the cam ring at a support surface to provide a more precise control of the pressure balance between the pressure plates and the pumping mechanism.

BACKGROUND OF THE INVENTION

This invention relates to power transmissions and is particularly applicable to those of the type comprising two or more fluid pressure energy translating devices, one of which may function as a pump and another as a fluid motor.

The invention relates generally to rotary fluid pumps and particularly to those of the vane type.

One of the major problems encountered in designing rotary pumps is that of providing proper clearance between the rotor faces, and the surfaces against which they rotate. There should be a slight clearance in order for the rotor to run freely but the clearance should not be too high because of decreasing the volumetric efficiency of the pump. Where the abutting surfaces are stationary, the parts must be machined to very close tolerances and in spite of maintaining close manufacturing tolerances, leakage will increase as the operating pressure increases and with changes in the viscosity of the fluid medium.

In devices of the rigidly clamped, fixed side type, leakage will increase even though the running clearance be small and even where it is possible to maintain the small running clearance fixed under high pressure operating conditions. Actually, under extremely high pressure operating conditions, the high pressure existing along the outer faces of the rotor tend to deflect the inner faces of the cheek plate outwardly away from the rotor which tends to increase the running clearance between the rotor and cheek plates and further increase leakage.

In rotary pumps or motors utilizing a single cheek plate of the pressure-loaded type, leakage between the rotor face on one side may be maintained substantially constant or even reduced with increases of pressure by utilizing a deflectable type of cheek plate as disclosed in the patent to Duncan B. Gardiner, et al., No. 2,544,988. This does not, however, reduce the leakage factor on the opposite side of the rotor face. In some single pressure loaded cheek plate devices under extremely high pressure conditions demanded in many present day hydraulic applications, there is a tendency for the inner surface of the fixed cheek plate on the opposite side of the rotor to deflect outwardly to increase the leakage path, thus, the problem is multiplied with the result that volumetric efficiency is materially reduced.

It is therefore necessary at high pressures to adequately control the leakage paths on both sides of the rotor as well as to provide proper clearance between the rotor faces and the surfaces against which they rotate.

One method for minimizing or controlling the leakage paths on each side of the rotor while improving the volumetric efficiency of the pump is to provide a balanced removable cartridge unit which incorporates a symmetrical dual floating cheek plate system designed to maintain a given ring rotor clearance space independent of load pressure, such as the type disclosed in the patent to me No. 3,187,678. Such floating cartridge type pumps are a great improvement over the fixed type and single plate type.

The amount of clearance between the rotor and cheek plate is dependent upon several factors including: the relationship between the effective pressure areas which act to maintain the cheek plates in fluid sealing engagement with the ring and rotor; the design and the material of the cheek plates which determines the amount of deflection of the plates; the initial clearance between the cheek plate and rotor before pressure is applied. By varying any or all of these factors, a proper running clearance may be achieved.

In units of this type, the cheek plates contact the cam ring along an annular region near the periphery of the cheek plate with a substantially high contact force which tends to compress the cam ring causing a slight bulge at its center which is evidenced by a wearing of the vanes at the center of their cam engaging surfaces.

This high contact force has resulted in a fritting of the surface at the high points on the cam ring and cheek plate surfaces where contact between the two is made. This fritting may lead to a dimensional change and to a weakening of the parts resulting in a premature failure of the unit. One method of eliminating this adverse condition would be to remove the high points in the cam and cheek plate to assure a substantially flat contact surface between the two. Such an approach would be economically prohibitive and would require unrealistic tolerances.

SUMMARY OF THE INVENTION

This invention comprises a rotary fluid pressure energy translating device having a deflectable pressure responsive cheek plate floatably mounted therein and adapted to abut a cam ring having a pumping mechanism therein in which the deflection of the cheek plate inwardly towards the pumping mechanism will determine the clearance between the same; the cheek plate having a balancing recess thereon and facing the cam ring at the support surface to provide a more precise control of the pressure balance between the cheek plate and the pumping mechanism.

It is therefore an object of this invention to provide a fluid pressure energy translating device having an improved controlled unbalance pressure relationship between the cheek plate and the cam ring which is capable of operating at extremely high pressures.

Another object of this invention is to provide a fluid pressure energy translating device having an improved controlled unbalance pressure relationship between the cheek plate and the cam ring which will reduce the contact force between the same, thus assuring the structural integrity of the unit.

Still another object of this invention is to provide a fluid pressure energy translating device having a more precise control of the pressure balance between the cheek plates, the cam ring, and the pumping mechanism which will reduce wear between the same.

A still further object of this invention is to provide a fluid pressure energy translating device having the herebefore mentioned advantages without resorting to costly machinery, expensive manufacturing techniques or unrealistic tolerances.

Further objects and advantages of the present invention will be apparent from the following description, reference being made to the accompanying drawing wherein a preferred form of the present invention is clearly shown.

Figure 2:
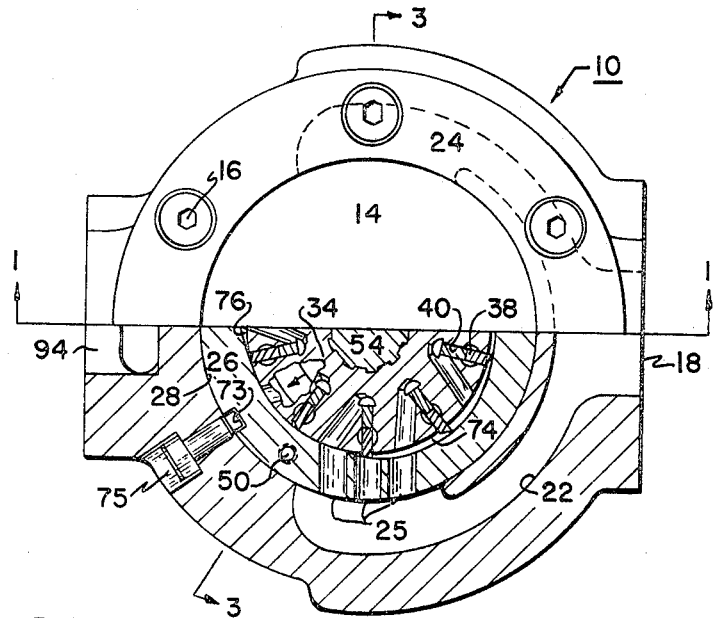
FIG. 2 is a plain view of the preferred form showing a section which is taken on line 2—2 of FIG. 1.
Figure 1:
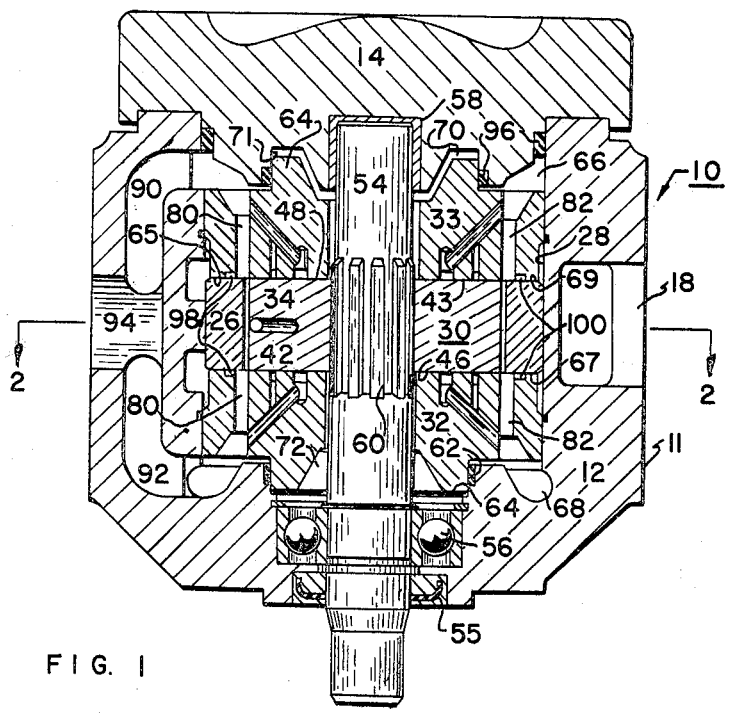
FIG. 1 is a sectional view of a preferred form of the present invention taken on line 1—1 of FIG. 2.
Figure 4:
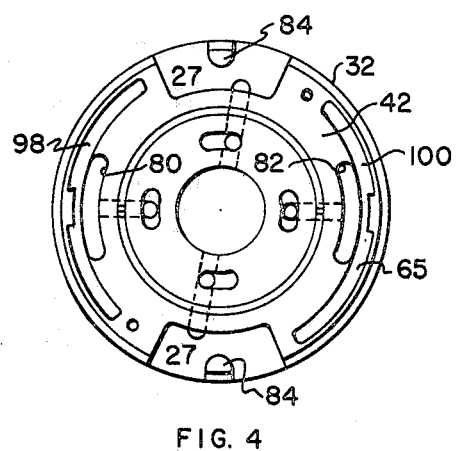
FIG. 4 is a front view of the inner surface of each cheek plate.
Figure 5:
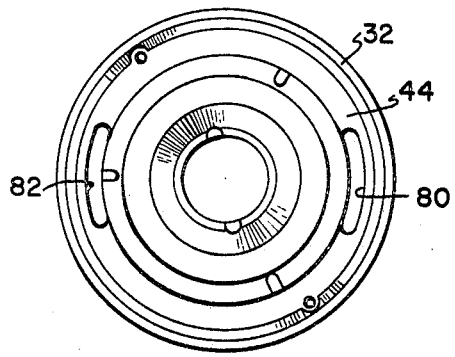
FIG. 5 is a view of the outer surface of each cheek plate.
Figure 3:
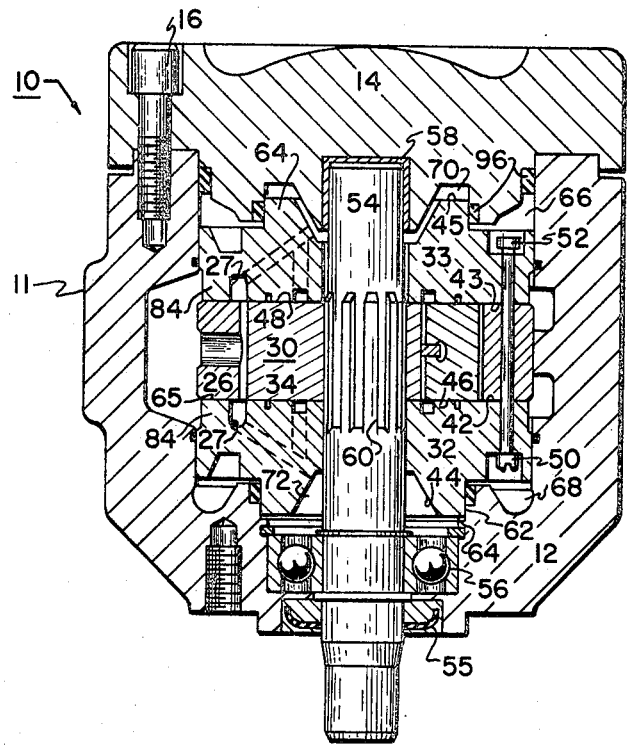
FIG. 3 is a sectional view taken on line 3—3 of FIG. 2.

Referring now to the figures, and especially FIG. 1, there is shown a rotary sliding vane device or pump, indicating generally by the numeral 10, the housing 11 of which comprises a body member 12 and an end cover 14 which is secured to the body 12 by bolts 16 extending through cover 14 into the threaded holes provided in the body 12. The body member 12, as shown in FIG. 2, is provided with an inlet supply connection 18 having an operating passage leading therefrom and dividing into the two branched passages 22 and 24 respectively, extending in opposite directions, each branch terminating in a plurality of fluid inlet ports 25 located in ring 26 and in a pair of fluid inlet ports 27 provided in the cheek plates 32 and 33 which will be explained later. The housing 11 has a cylindrical bore 28 in which is floatably mounted a symmetrical arranged cartridge unit 30.

Devices using axially floating pumping cartridges of the rotary sliding vane type are well-known in the art, and reference may be made to Patent No. 3,187,678 issued to me for a description and explanation of the operation and assembly of such a device.

In such devices, the cartridge 30 is comprised of a cam ring 26, a pumping mechanism or rotor 34, which is rotatable in the cam ring 26, and a pair of identical and interchangeable elastic deflectable cheek plates 32 and 33, one positioned on each side of the rotor 34 and ring 26. A plurality of vanes 38 are movable in and out of the slots 40 provided in the rotor 34 as the rotor turns around the cam ring 26. Each cheek plate 32 and 33 have identical inner faces 42 and 43, identical outer faces 44 and 45, the inner face 42 being positioned directly opposite the rotor face 46 and the inner face 43 being positioned directly opposite the rotor face 48 so as to provide a small running clearance between the plates 32 and 33 and the side faces on surfaces of the rotor 34. A pair of bolts 50 extend through the plates 32 and 33 and ring 26. Nuts 52 hold the cartridge unit 30 together. The nut and bolt assemblies hold the ring 26, rotor 34, and plates 32 and 33 together as the cartridge unit 30 for assembly convenience as well as to prevent radial rotation of the plates 32 and 33 in the bore 28. The nut 52 is usually loosely fitted on the bolts 50 and has no effect on mechanically loading the bolt 50, thus the cheek plates are considered as being floatably mounted.

The rotor 34 is driven by a shaft 54 supported solely within the body 12 by means of a bearing 56 located near one end of the bore 28 in the body 12 and a bearing 58 located in the cover 14 at the other end of the bore 28. The shaft 54 is operatively connected to the rotor 34 by means of a spline connection indicated by the numeral 60 and is further provided with a shaft seal 55 which prevents leakage at the juncture of the shaft 54 from the pump body 12.

A stepped-up portion 62 on each outer face 44 and 45 of each cheek plate forms an internal annular hub member 64.

The cartridge unit 30 defines with the housing 11 and with the outer ends of the bore 28, a pair of operating pressure chambers 66 and 68, one located at each end of the bore 28, which are connected to the outlet side of the pump 10. The pressure chambers 66 and 68 act against the annular space at the outer rims starting at the outer periphery of each cheek plate and extending inwardly to the hubs 64 so as to urge the cheek plates 32 and 33 into fluid sealing engagement with a portion of the outer surfaces of the rotor 34 and the cam ring 26 in a manner to be described later. The plates 32 and 33 respectively abut the cam ring side surfaces 67 and 69 in a generally annular region 65 located near the periphery of each plate face 42 and 43.

A pair of low pressure chambers 70 and 72 are also located one on each end of the bore, and are connected to the inlet side of the pump 10. The low pressure chambers 70 and 72 are formed by the hub member 64 with the housing surface directly opposite therefrom. Each of the low pressure chambers 70 and 72 have a circumferential surface 71 in the housing 11 in which the stepped-up portion 62 of the floating cheek plates 32 and 33 telescopically engages.

A rectangular slot or chambered hole 73 is provided in the ring 26. A locating pin 75 is adjustably inserted in the housing 11 so as to engage the hole 73, thereby preventing the ring 26 from radially rotating in the bore 28. The diameter of the hole 73 is of such a size so as to permit the cam ring 26, and thus the cartridge unit 30, to move axially in the bore 28 in response to the summation of the hydraulic forces acting thereon. The cartridge assembly 30 is considered to be freely floating in the bore 28.

With the rotor 34 mounted within the cam ring 26 two opposing working chambers 74 and 76 are formed through which the vanes 38 pass as the rotor 34 turns. These chambers may be divided in fluid inlet zones and fluid outlet zones, the former of which comprise that portion of the chambers 74 and 76 registering with the plurality of inlet passages 25, provided in the ring 26 and with the pair of diametrically opposed fluid ports 27 provided in each of the cheek plates 32 and 33. The outlet zones comprise that portion of the chambers registering with a pair of diametrically opposed fluid outlet ports 80 and 82 in each of the cheek plates and which extend entirely through each of the cheek plates 32 and 33.

The floatable cartridge unit 30 is usable with any type of a vane construction and for the purpose of illustration, the rotor 34 employs intravanes 38 the operation of which and the pressure transmitting arrangement therefor are well known and are described in the herebefore mentioned patent to me.

The pair of inlet ports 27 provided in each of the cheek plates 32 and 33 are, in effect, cut out portions in each plate 32 and 33 which start at a point on the outer periphery of the flange near the mid-section thereof and extend radially, inwardly, and then extend in an axial direction to the near face 42 and 43 of each plate. Boss means 84 are located in each of the inlet ports 27 and are flush with the inner surfaces of the cheek plates 32 and 33 so as to engage the ring 26.

The fluid outlet ports 80 and 82 are in communication with the pressure chambers 66 and 68. A pair of converging outlet operating high pressure passages 90 and 92 connect each of the pressure chambers with the outlet connection 94 located in the housing 11. A plurality of O-rings 96 are provided at strategic locations so as to prevent leakage.

There is provided a pair of diametrically opposed balancing recesses 98 and 100 by profiling, in relief, the areas of the cheek plate along the general annular region of contact, herebefore mentioned, associated with each outlet fluid port 80 and 82 in each cheek plate and facing the corresponding side faces of the cam ring, the purpose of which will be described later. The balancing recesses 98 and 100 are in fluid communication with the outlet fluid ports 80 and 82 respectively.

Figure 6:
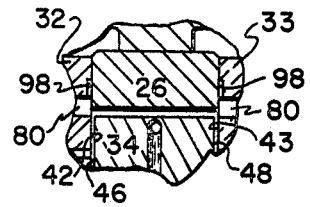
FIG. 6 is a fragmentary view of FIG. 1 showing rotor clearance in exaggerated form.
Figure 7:
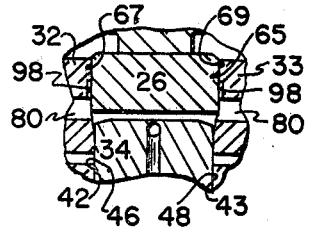
FIG. 7 is a fragmentary view similar to FIG. 4, but showing rotor clearance upon deflection of the cheek plate.

As herebefore mentioned, the hydraulic pressure in the chambers 66 and 68 respectively act against a portion of the outer faces 44 and 45 of each cheek plate 32 and 33 opposite to the inner surfaces 42 and 43 facing the cam and rotor surfaces in order to urge and deflect the cheek plates in fluid sealing engagement and mechanical abutment with the opposite side surface 46 and 48 of the rotor 34 and with the opposite side surfaces 67 and 69 of the cam ring, respectively. As shown in exaggerated form in FIG. 6, the cam ring 26 is of slightly greater width than the rotor 20 to provide a proper running clearance between the inner faces of the cheek plates and opposite side surfaces of the rotor. As the cheek plates are adapted to deflect slightly, as shown in exaggerated form in FIG. 7, the amount of running clearance is dependent upon the design of the cheek plate and the material of which it is constructed. An elastic deflectable cheek plate of a suitable material such as cast iron may be used. In the device illustrated, the clearance is on the order of a thousandth of an inch.

It should be noted that the sole support against the inward movement of the cheek plate is that provided by a portion of the cam ring against which the peripheral edge of the cheek plate is forced by pressure fluid in the chambers 66 and 68. The remainder of the cheek plate within the cam ring is entirely unsupported against inward axial movement because of the clearance provided between the rotor and the cheek plate. Thus, the pressure plate is designed to provide a predetermined deflection of its unsupported surface as a function of the pressure existent across the rotor faces 46 and 48 and at the outlet side of the pumping unit. As the pressure in the chambers 66 and 68 increases, the cheek plate will deflect toward the rotor and reduce the rotor clearance.

By providing a balancing recess of a predetermined size with each fluid port on each plate, a reaction force is created which will oppose the force created by pressure acting on the outer surfaces of the plates 32 and 33, thus, the reaction force will tend to separate the plates from the corresponding rotor and cam ring side surfaces.

Thus, the amount of fluid sealing engagement between the cheek plate and rotor may be more precisely controlled by designing the size of the balancing recesses in relation to the shape, thickness, and material of the plate, and the pressures to which it will be subjected resulting in maintaining the volumetric efficiency of the pump at a desired level while having reduced the contact force between the cheek plate surface and the cam ring surface where they abut along the generally annular region of the cheek plate periphery with a corresponding reduction of a fritting of the same.

It can thus be seen that the contact force between the respective surfaces is dependent upon the size of the balancing recesses and by proper sizing, the device may be operated at extremely high pressure while assuring the structural integrity of the unit.

There is thus provided a fluid pressure energy translating device which not only provides a more precise control of the pressure balance between the respective cheek plate, cam ring, and rotor surfaces, but which reduces the contact force between the same.

While the form of embodiment of the present invention constitutes a preferred form it is to be understood that other forms might be adapted, all coming within the scope of the claims which follow.

What is claimed is as follows:

1. A fluid pressure energy translating device comprising: a housing including low and high pressure operating passages, one of which is an inlet passage and the other an outlet passage;
   an axially shiftable cam ring in said housing;
   a vane carrying rotor rotatably mounted within the cam ring and forming fluid inlet and fluid outlet zones;
   a first floatably mounted cheek plate member having hydraulic pressure applied to one face thereof;
   a second floatably mounted cheek plate member having hydraulic pressure applied to one face thereof;
   said cam ring being disposed between said cheek plates with said hydraulic pressure creating a force urging the opposite faces of said cheek plates into mechanical abutment with the opposite faces of said cam ring in a generally annular region located near the periphery of each cheek plate;
   means forming a pair of fluid ports in each of said plates, said ports being in fluid communication with one of said fluid zones;
   means forming a pair of balancing recesses of a predetermined size along said annular region between each abutting face of said cam ring and said cheek plates, said recess means being formed in each of said cheek plates along said annular region and facing said opposite faces of said cam ring, one of said recesses in each plate being associated with and in fluid communication with one of said fluid ports, the other recess in each plate being associated with and in fluid communication with the other of said fluid ports, thereby creating a reaction force opposing the first mentioned force;
   means forming a passage connecting said fluid ports to one of said pressure operating passages;
   means forming a second pair of fluid ports in each of said plates circumferentially spaced from said first mentioned pair of ports in each plate, said second pair of ports being in fluid communication with the other of said fluid zones; and
   means forming a passage connecting said second pair of fluid ports to the other of said pressure operating passages.

2. A fluid pressure energy translating device comprising:
   a housing including low and high pressure operating passages, one of which is an inlet passage, the other an outlet passage;
   a cartridge assembly floatably mounted in said housing, said assembly including a vane carrying rotor circumscribed by an axially shiftable cam ring of greater width than the rotor to form fluid inlet and fluid outlet zones which are enclosed by a pair of axially shiftable elastic deflectable cheek plates, the inner surfaces of which are adapted to be urged and deflected respectively into fluid sealing engagement and mechanical abutment respectively with opposite side faces of the ring and rotor, said cheek plates having outer surfaces each of which has hydraulic pressure applied to said outer surfaces creating the motive force for said urgement and deflection;
   means forming a pair of diametrically opposed fluid ports in each of said plates, said ports being in fluid communication with one of said fluid zones;
   means forming a pair of diametrically opposed balancing recesses of a predetermined size in each of said cheek plates and facing said opposite side faces of said cam ring, one of said recesses in each plate being associated with and in fluid communication with the one of said fluid ports; the other recess in each plate being associated with and in fluid communication with the other of said fluid ports;
   means forming a passage connecting said fluid ports to one of said operating passages;
   means forming a second pair of diametrically opposed fluid ports in each of said plates circumferentially spaced from said first mentioned pair of ports in each plate, said second pair of ports being in fluid communication with the other of said fluid zones;
   means forming a passage connecting said second fluid ports to the other of said pressure operating passages;
   said balancing recesses creating a reaction force opposing the first mentioned force whereby the amount of fluid sealing engagement and mechanical abutment between said opposite side faces may be controlled for preventing seizure or fritting of the same.

References Cited

UNITED STATES PATENTS

| | | | |
|---|---|---|---|
| 3,187,678 | 6/1965 | Pettibone | 103—136 |
| 3,204,565 | 9/1965 | Kirkpatrick | 103—136 |
| 3,204,566 | 9/1965 | Feroy. | |
| 2,544,988 | 3/1951 | Gardiner et al. | 103—135 |
| 3,254,606 | 6/1966 | Rosaen | 103—136 |
| 3,311,064 | 3/1967 | Eichele et al. | 103—136 |
| 3,334,591 | 8/1967 | Dymond | 103—136 |
| 3,404,634 | 10/1968 | Connelly. | |

DONLEY J. STOCKING, Primary Examiner

WARREN J. KRAUSS, Assistant Examiner

U.S. Cl. X.R.

103—126